(12) United States Patent
Zlot et al.

(10) Patent No.: US 11,340,632 B2
(45) Date of Patent: May 24, 2022

(54) GEOREFERENCED TRAJECTORY ESTIMATION SYSTEM

(71) Applicant: UATC, LLC, San Francisco, CA (US)

(72) Inventors: Robert Zlot, Pittsburgh, PA (US);
Ethan Duff Eade, Pittsburgh, PA (US);
Peter Hansen, Pittsburgh, PA (US);
David Prasser, Pittsburgh, PA (US);
Xxx Xinjilefu, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 256 days.

(21) Appl. No.: 16/366,543

(22) Filed: Mar. 27, 2019

(65) Prior Publication Data

US 2019/0302801 A1    Oct. 3, 2019

Related U.S. Application Data

(60) Provisional application No. 62/648,541, filed on Mar. 27, 2018.

(51) Int. Cl.
*G05D 1/02* (2020.01)
*H04W 4/46* (2018.01)
(Continued)

(52) U.S. Cl.
CPC ......... *G05D 1/0289* (2013.01); *G01C 21/165* (2013.01); *G05D 1/0255* (2013.01);
(Continued)

(58) Field of Classification Search
CPC .... G01S 13/93; G01S 13/931; G01S 13/9318; G06T 7/30; G05D 1/021; G05D 1/0212; G05D 1/0088; G05D 1/0274; G05D 1/0289; G05D 1/0293; G05D 1/0257; G05D 1/0255; G05D 2201/0213; H04Q 9/10; H04W 4/029; H04W 4/46; H04W 4/02;
(Continued)

(56) References Cited

U.S. PATENT DOCUMENTS 8,977,074 B1 * 3/2015 Berent ................... G06T 17/05
382/294
10,599,150 B2 * 3/2020 Graham ................. G05D 1/021
(Continued)

OTHER PUBLICATIONS

"U.S. Appl. No. 16/366,561, Non Final Office Action dated Apr. 29, 2021", 14 pgs.
(Continued)

*Primary Examiner* — Thomas G Black
*Assistant Examiner* — Ellis Bernardo Ramirez
(74) *Attorney, Agent, or Firm* — Schwegman Lundberg & Woessner, P.A.

(57) ABSTRACT

A georeferenced trajectory estimation system receives data generated by vehicle sensors from a fleet of vehicles and identifies sets of sensor measurements for a geographic region taken at different times. The sets of sensor measurements include environment geometry data and unaligned trajectory data in local coordinate frames. The georeferenced trajectory estimation system aligns the environment geometry data between sets of sensor measures, and, based on the alignment of the environment geometry data, transforms the identified corresponding trajectory data into a common coordinate frame.

20 Claims, 6 Drawing Sheets

(51) Int. Cl.
*G07C 5/00* (2006.01)
*G08G 1/16* (2006.01)
*G01C 21/16* (2006.01)

(52) U.S. Cl.
CPC ......... *G05D 1/0257* (2013.01); *G05D 1/0293* (2013.01); *G07C 5/008* (2013.01); *G08G 1/161* (2013.01); *G08G 1/166* (2013.01); *H04W 4/46* (2018.02); *G05D 2201/0213* (2013.01)

(58) Field of Classification Search
CPC . H04W 4/40; G05B 2219/4017; G07C 5/008; G08G 1/161; G08G 1/166; G01C 21/165; G01C 21/32
USPC ............ 701/23, 65, 117, 301, 409, 446, 450
See application file for complete search history.

(56) References Cited

U.S. PATENT DOCUMENTS

| | | | |
|---|---|---|---|
| 2009/0292468 A1* | 11/2009 | Wu | G01S 13/867 701/301 |
| 2015/0123995 A1* | 5/2015 | Zavodny | G06T 7/30 345/630 |
| 2018/0045519 A1 | 2/2018 | Ghadiok et al. | |
| 2018/0173242 A1* | 6/2018 | Lalonde | G05D 1/0274 |
| 2018/0188039 A1 | 7/2018 | Chen et al. | |
| 2018/0188043 A1* | 7/2018 | Chen | G05D 1/0088 |
| 2018/0367871 A1* | 12/2018 | Zeng | G01S 17/89 |
| 2019/0301873 A1 | 10/2019 | Prasser et al. | |
| 2020/0103236 A1* | 4/2020 | Adams | G01C 21/3626 |

OTHER PUBLICATIONS

"U.S. Appl. No. 16/366,561, Response filed Jul. 29, 2021 to Non Final Office Action dated Apr. 29, 2021", 15 pgs.

"U.S. Appl. No. 16/366,561, Examiner Interview Summary dated Jul. 30, 2021", 2 pgs.

"U.S. Appl. No. 16/366,561, Notice of Allowance dated Sep. 17, 2021", 8 pgs.

"U.S. Appl. No. 16/366,561, 312 Amendment filed Oct. 5, 2021", 3 pgs.

* cited by examiner

GEOREFERENCED TRAJECTORY ESTIMATION SYSTEM

CROSS-REFERENCE TO RELATED APPLICATIONS

The present application claims priority to U.S. Provisional Patent Application No. 62/648,541, filed Mar. 27, 2018, and entitled "Georeferenced Trajectory System." The contents of that provisional patent application are hereby incorporated by reference.

TECHNICAL FIELD

The disclosure herein is directed to a georeferenced trajectory estimation system and related methods for generating a map and navigating a vehicle using trajectory data.

BACKGROUND

Autonomous vehicle technology typically relies on the fusion of sensor data to enable a computational control system of the autonomous vehicle to perform perception, prediction, motion planning, and vehicle control operations. A key aspect to autonomous vehicle systems is the continuous determination of the autonomous vehicle's state, which can include the vehicle's position, orientation, trajectory, velocity, etc. with respect to the world around it (e.g., in a common and/or local reference frame). These operations are referred to as localization operations, or the determination of the vehicle's pose. Various methods of localization require the use of a sensor suite, which can comprise any number and type of sensors, such as radar, LIDAR, cameras, sonar, infrared, satellite positioning systems, and inertial measurement unit sensors. Accurate localization can also be aided by preconstructed localization maps that contain detailed prior data of a geographical region in which the autonomous vehicle operates.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
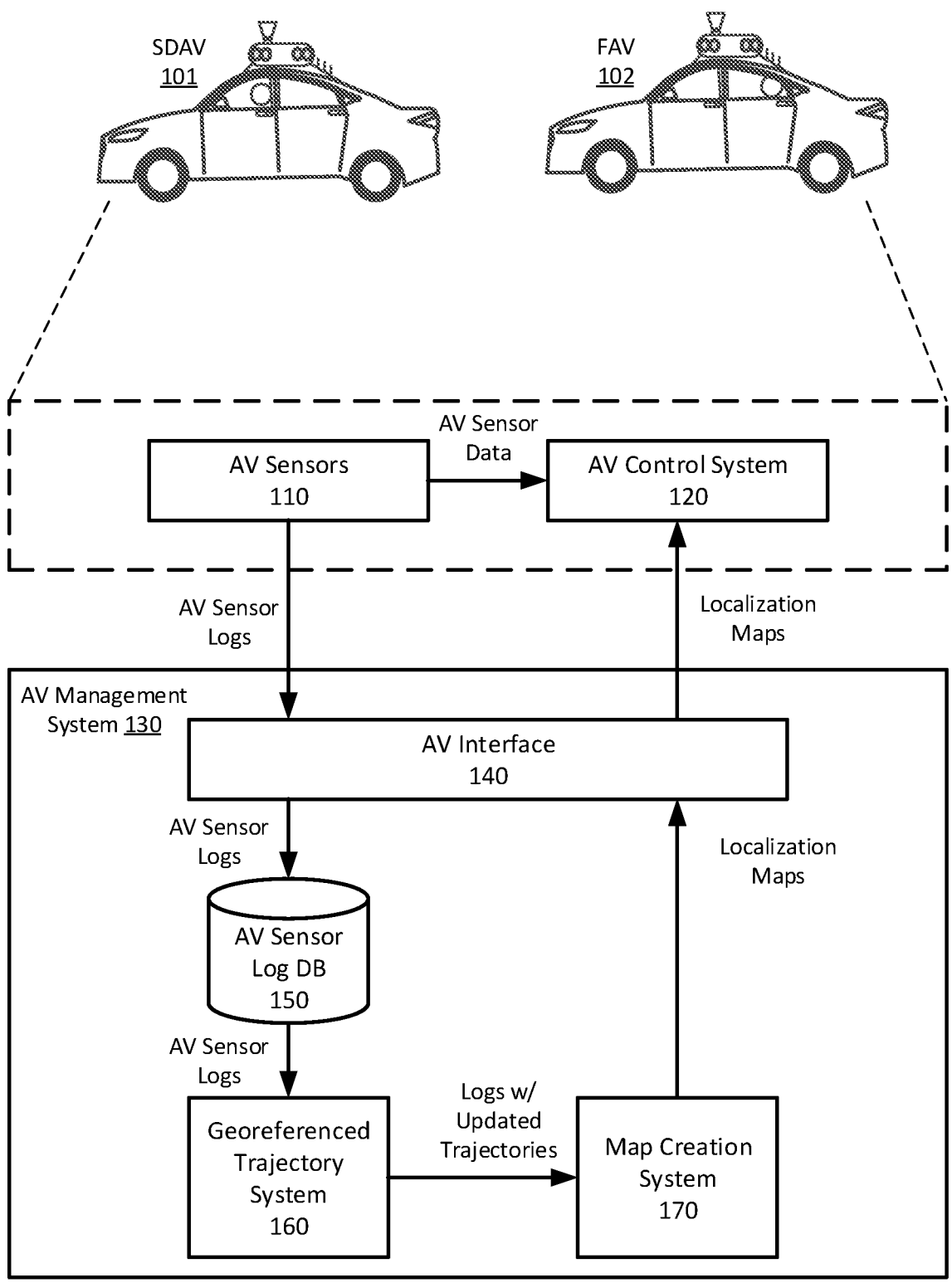
FIG. 1 is a block diagram illustrating autonomous vehicles in communication with an autonomous vehicle management system, according to examples described herein.

In order to navigate its surrounding environment, an autonomous vehicle (AV) can include a perception sensor system generating sensor data used to build a sensor view of the environment. The perception sensor system can include any number of cameras (e.g., stereoscopic or monocular cameras), LIDAR sensors, sonar sensors, infrared sensors, radar, inertial measurement units (IMU), encoders (e.g., wheel speed encoders), and/or other types of proximity or imaging sensors. The control system can comprise one or more processors executing an instruction set that causes the control system to process a sensor view generated by the perception sensor system to perform object detection operations and autonomously operate the vehicle's acceleration, braking, and steering systems. In addition, the sensor data generated from the various AV sensors can be logged and uploaded to an AV management system.

To aid in navigating the environment, autonomous vehicles can also rely on preconstructed localization maps that contain detailed prior data. For example, the localization maps can encompass long stretches of highways, city road segments, and the like. In order to create and update these localization maps, the AV management system can use the sensor data that are collected and stored by a fleet of autonomous vehicles and/or human-driven vehicles. Accordingly, the map creation process takes sensor logs, or mapping logs, captured in a target geographic region as input. However, these logs should first be imbued with accurate global trajectories so that the map creation process can subsequently produce the geometric models to which lanes, intersections, and other autonomy-relevant map entities are registered. The map creation process generates new map geometry by identifying the time intervals of sensor logs for a region, registering the associated environment geometry data (e.g., LIDAR points) into a common coordinate frame, and generating a geometric model of the world in that region.

Multiple sets of log data for a single geographic region are combined to generate more accurate localization maps and fill in gaps that may exist in a single log due to obstructions such as other vehicles (either parked or moving), pedestrians, the space underneath the vehicle, etc. However, to be used for autonomous vehicle operation, localization for sensor logs should be relatively accurate within and across multiple logs to the level of centimeters/milliradians. Generating accurate geometric models relies on the reliability of the trajectories (i.e., sequence of poses) for each of the sensor logs. Repeated visits to the same region minutes or days apart, whether by the same vehicle or different vehicles, need corresponding pose estimates that accurately co-register sensor data such as LIDAR point clouds. Incorrect registration results in multiple ground layers, doubled or fuzzy walls, etc., any of which can challenge or thwart subsequent stages of the map creation process. Localization for sensor logs should also be globally accurate to the extent that crude road network information maps roughly to where it should within the created localization maps or submaps and reported global positions (in latitude/longitude) are sufficiently accurate for vehicle routing.

Localization mapping systems experience numerous technical challenges, including low-quality and unreliable global positioning system (GPS) data, especially in urban canyons, and the difficulty of aligning LIDAR in dynamic environments. Furthermore, accurate trajectories estimated independently per vehicle log are insufficient because the trajectories would only be accurate in their local coordinate frame. Therefore, each of the vehicle logs in a dataset should be jointly registered into a common coordinate frame, requiring cross-log registration of observed geometry. In addition, pose graph optimization on datasets of this size—many millions of nodes and edges—requires sophisticated techniques. Finally, the final trajectories should be not only accurate and coherent, but also consistent with existing map skeletons (extents from road networks) to within bounds acceptable to map production policies, which is a challenge since these skeletons are not directly observable from sensor data.

Among other advantages, a georeferenced trajectory estimation system such as described herein is able to produce trajectories uniformly more suited to map creation by using the same source sensor (e.g., LIDAR unit on a given AV) that generated the data to be co-registered to also help estimate the trajectory. In addition, aligning data across multiple logs early in the map creation process can average out systematic error from low quality GPS data.

According to some aspects, a georeferenced trajectory estimation system receives data generated by vehicle sensors from a fleet of vehicles. The georeferenced trajectory estimation system identifies, from the received data, a first set of sensor measurements for a geographic region taken by a first vehicle over a first period of time. The first set of sensor measurements includes (i) first environment geometry data for the geographic region, and (ii) first trajectory data, in a first coordinate frame, for the first vehicle. The georeferenced trajectory estimation system identifies, from the received data, a second set of sensor measurements for the geographic region taken by a second vehicle over a second period of time. The second set of sensor measurements includes (i) second environment geometry data for the geographic region, and (ii) second trajectory data, in a second coordinate frame, for the second vehicle. The georeferenced trajectory estimation system aligns the first environment geometry data with the second environment geometry data, and, based on the alignment of the first environment geometry data with the second environment geometry data, non-rigidly transforms the first trajectory data and the second trajectory data into a common coordinate frame.

In some aspects, a geometric model of the geographic region is generated using the transformed trajectory data. In further aspects, an autonomous vehicle is navigated through the geographic region using the geometric model.

In some aspects, the trajectory data for the vehicles comprise sequences of poses for each of the vehicles over the relevant period of time. The trajectory data can comprise measurements of vehicle position, orientation, force, or motion taken from at least one of an inertial measurement unit, encoder (e.g., a wheel speed encoder), and a Global Navigation Satellite System (e.g., GPS) unit. The environment geometry data can be taken from one or more LIDAR units, radar units, sonar units, and/or cameras.

In other aspects, the sets of sensor measurements include LIDAR beam intensity values for the geographic region, and the first trajectory data and the second trajectory data are transformed into the common coordinate frame based on an alignment of the LIDAR beam intensity values.

Numerous examples are referenced herein in context of autonomous vehicles. The term "autonomous vehicle" refers to a vehicle that is operated in a state of automation with respect to at least steering and propulsion. Different levels of autonomy may exist with respect to autonomous vehicles. For example, some vehicles may enable automation in limited scenarios, such as on highways, provided that a safety driver is present in the vehicle. More advanced autonomous vehicles can drive without any human assistance from within or external to the vehicle.

The term "spline" is used to refer to a wide class of functions that are used in applications requiring data interpolation and/or smoothing. The data may be either one-dimensional or multi-dimensional. Spline functions for interpolation are normally determined as the minimizers of suitable measures of roughness (for example integral squared curvature) subject to the interpolation constraints. Smoothing splines may be viewed as generalizations of interpolation splines where the functions are determined to minimize a weighted combination of the average squared approximation error over observed data and the roughness measure. For a number of meaningful definitions of the roughness measure, the spline functions are found to be finite dimensional in nature, which is the primary reason for their utility in computations and representation.

A "geographic region" can refer to any physical area accessible by vehicle and its surrounding environment, including road segments, combinations of road segments, neighborhoods, cities, etc.

One or more aspects described herein provide that methods, techniques and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices), and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected gates.

EXAMPLE SYSTEMS

FIG. 1 is a block diagram illustrating autonomous vehicles in communication with an autonomous vehicle management system. In an example of FIG. 1, an autonomous vehicle (AV) control system 120 can operate an autonomous vehicle through a geographic region for a variety of purposes, including transport services (e.g., on-demand transport, freight and delivery services, etc.). In examples described, autonomous vehicles can operate without human control, and instead, the AV control system 120 can autonomously steer, accelerate, shift, brake, and operate lighting components of the vehicle.

An autonomous vehicle management system 130 can manage a fleet of AVs at different levels of autonomy. For example, some of the AVs can be safety driver autonomous vehicles (SDAV) 101, where a safety driver sits in the driver seat. An SDAV 101 can switch between an autonomous mode, in which the vehicle control system 120 autonomously operates the vehicle, and a manual mode in which the safety driver takes over manual control of the vehicle. Other AVs in the fleet can be fully autonomous vehicles (FAV) 102 with no manual mode or safety driver.

Each AV can be equipped with multiple types of sensors 110 which can combine to provide a computerized perception, or sensor view, of the space and the physical environment surrounding the AV. Likewise, the control system 120 can operate within the AVs to receive sensor data from the AV sensors 110 and control the various vehicle functions in order to autonomously operate the vehicle. For example, the control system 120 can analyze the sensor data to generate low level commands executable by acceleration, steering, and braking systems of the AV. Execution of the commands by the control mechanisms can result in throttle inputs, braking inputs, and steering inputs that collectively cause the AV to operate along sequential road segments according to a route plan.

In more detail, the AV sensors 110 operate to obtain a live sensor view for the vehicle control system 120 (e.g., in a forward operational direction, or providing a 360-degree sensor view), and to further obtain situational information proximate to the AVs, including any potential hazards or obstacles. The sensors 110 can include both passive sensors and active sensors. The passive sensors can include any number of stereoscopic or monocular cameras, infrared or other proximity sensors, inertial measurement units (e.g., accelerometers, gyroscopes, and/or magnetometers), wheel speed encoders, etc. The active sensors can include sensors 110 that emit electromagnetic radiation to detect return signals (e.g., LIDAR or radar), and in some examples, can also include one or more ultrasonic sensors that emit ultrasonic sounds waves and detect return signals (e.g., return pressure pulses) to enable the control system 120 to perform ranging operations. In addition, the vehicle can further include one or more position sensors, such as a Global Navigation Satellite System (GNSS) unit (e.g., a GPS unit).

In various examples, some of the AV sensors 110 can be arranged in a sensor suite or sensor array mounted to the exterior of the AV, such as on the front bumper and/or roof. In general, the AV sensors 110 collectively provide sensor data to a localization engine of the vehicle control system 120. The localization engine can also access data storage containing localization maps of the given region in which the AVs operates. The localization maps can comprise a series of road segment submaps that enable the localization engine to dynamically determine an estimated state of the AV.

In addition to using the AV sensor data to control the vehicle itself, an AV can timestamp and log the raw sensor data, store the logs in the vehicle's data storage, and upload the logs of the sensor data to the AV management system 130. Using the logs from the fleet of AVs in a geographic region, the AV management system 130 can create and update the localization maps for that region.

According to some examples, an AV can upload its logged sensor data to the AV management system 130 through an AV interface 140, either on a set schedule (e.g., once per hour), in response to a request for the logs, in response to an event, or continuously. The AV interface 140 enables the AV management system 130 to exchange data with the AVs over a network. For example, the AV interface 140 can use one or more network resources (e.g., a cellular transceiver, a WLAN transceiver, etc.) to exchange communications over one or more wireless networks. The AV interface 140 can include or implement an externally-facing application programming interface (API) to communicate data with the AVs. The externally-facing API can provide access to the AV management system 130 via secure channels over the network through any number of methods, including web-based forms, programmatic access via restful APIs, Simple Object Access Protocol (SOAP), remote procedure call (RPC), scripting access, etc. In some examples, the AV management system 130 stores the received AV sensor logs in an AV sensor log database 150.

In some aspects, a georeferenced trajectory estimation system 160 implements a pipeline that takes the raw sensor data in the logs and aligns vehicle trajectories into a common coordinate frame so that the map creation system 170 can generate and update localization maps without fuzzy data or ambiguity. Multiple sets of log data for a single geographic region can be combined to generate more accurate localization maps and fill in gaps that may exist in a single log due to obstructions such as other vehicles (either parked or moving), pedestrians, the space underneath the vehicle, etc. However, even if two sets of log data include sensor measurements for the same region, the sensor measurements are not in alignment with each other.

Generating accurate geometric models for the localization maps relies on the reliability and alignment of the trajectories (i.e., sequence of poses) for each of the logs. Repeated visits to the same region minutes or days apart, whether by the same vehicle or different vehicles, need corresponding pose estimates that accurately co-register sensor data, such as LIDAR point clouds, in the same coordinate frame. Incorrect registration results in multiple ground layers, doubled or fuzzy walls, etc., any of which can challenge or thwart the map creation system 170.

In one implementation, the AV management system 130 can provide a user interface for a user to select a geographic region (e.g., by drawing a polygon on a map, specifying latitude/longitude coordinates, etc.). The georeferenced trajectory estimation system 160 can retrieve the sensor logs that contain sensor data for the selected geographic region and execute the georeferenced trajectory optimization pipeline on the retrieved sensor logs. In addition, the user interface can provide further filtering tools for the logs, such as a filter for type of vehicle that generated the sensor data, a date range for the logs, etc. In other implementations, the AV management system 130, or an external system that interfaces with the AV management system 130, can execute scripts or other automated processes to run the georeferenced trajectory optimization pipeline on programmed regions on a schedule. The AV management system 130 can also generate a report or log to display to users which indicates success or failure of the georeferenced trajectory optimization or map creation process, among other information.

Using the raw sensor data from the sensor logs that correspond to the selected geographic region, the georeferenced trajectory estimation system 160 uses a multi-stage georeferenced trajectory optimization pipeline to align the vehicle trajectories into a common coordinate frame. In some aspects, the pipeline includes GPS spline estimation, cross-registration target selection, reference map extraction, LIDAR alignment, pose graph optimization, and trajectory optimization.

In one example, the georeferenced trajectory optimization pipeline results in amendments to each of the AV sensor logs that contain data for the selected region. Specifically, the georeferenced trajectory estimation system 160 overwrites an existing trajectory channel of each log with updated trajectories in the common coordinate frame that are generated from the georeferenced trajectory optimization pipeline. The amended logs can then be stored in the AV sensor log database 150 for subsequent use by the map creation system 170.

The map creation system 170 constructs new localization maps for unmapped geographic regions using the AV sensor logs stored in the AV sensor log database 150, including the logs with updated trajectories generated by the georeferenced trajectory estimation system 160. Once constructed, the AV management system 130 can transmit the localization maps to vehicles in the AV fleet through the AV interface 140, either as push updates or in response to requests from the vehicles for maps.

In various examples, the AV control system 120 can locally store and access the localization maps to perform dynamic comparisons with the live sensor view and to perform object detection and classification operations. As the control system 120 autonomously operates the vehicle along a given route, the AV control system 120 can access sequential localization maps of current road segments to compare the details of a current localization map with the sensor data in order to detect and classify any objects of interest, such as road debris, other vehicles, pedestrians, bicyclists, and the like. In accordance with many examples, the AV control system 120 can provide object of interest data to a prediction engine, where the objects of interest can each be classified (e.g., a pedestrian, a bicyclist, unknown objects, other vehicles, a static object, etc.).

Figure 2:
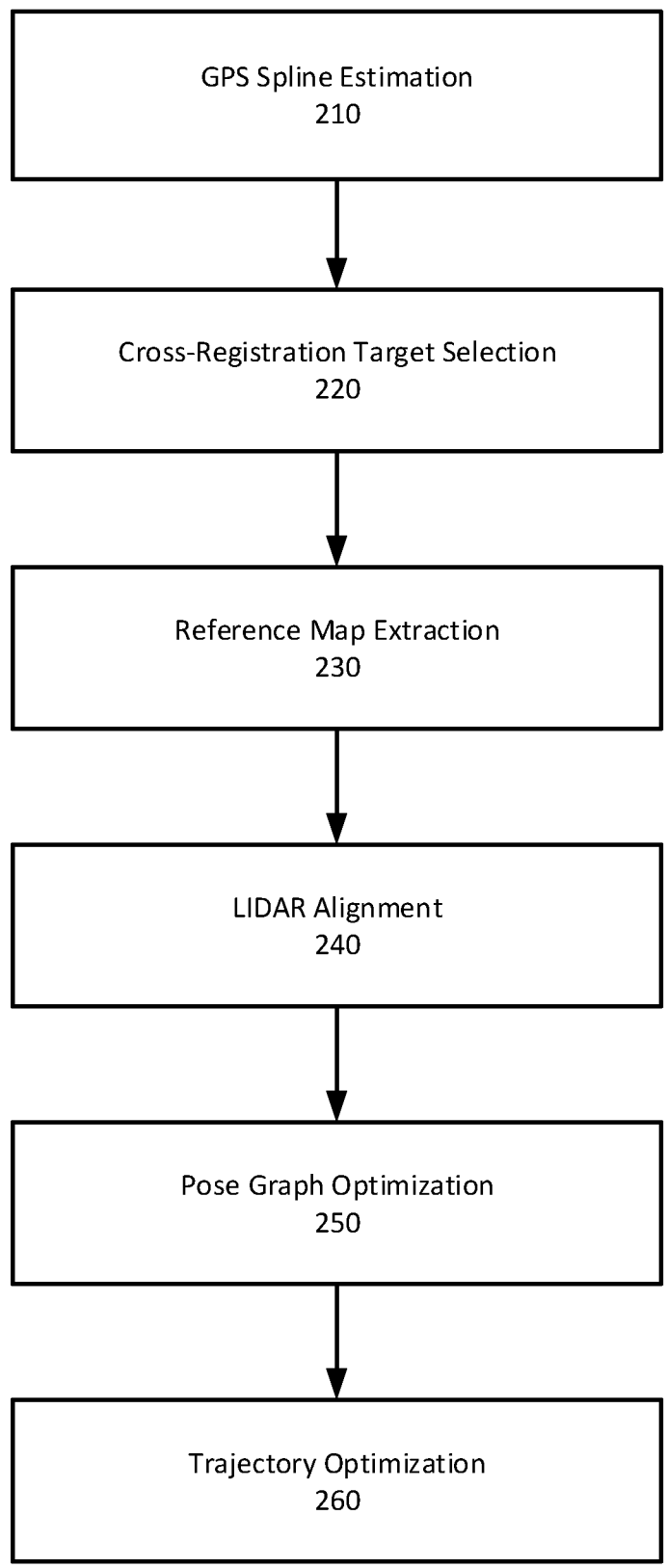
FIG. 2 is a flow chart describing a georeferenced offline trajectory optimization pipeline, according to examples described herein.

FIG. 2 is a flow chart describing a georeferenced offline trajectory optimization pipeline, according to examples described herein. While operations of the pipeline are described below as being performed by specific components, modules or systems of the AV management system 130, it will be appreciated that these operations need not necessarily be performed by the specific components identified and could be performed by a variety of components and modules, potentially distributed over a number of machines. Accordingly, references may be made to elements of the AV management system 130 for the purpose of illustrating suitable components or elements for performing a step or sub-step being described. Alternatively, at least certain ones of the variety of components and modules described in the AV management system 130 can be arranged within a single hardware, software, or firmware component. It will also be appreciated that some of the steps of this method may be performed in parallel or in a different order than illustrated.

According to some aspects, a georeferenced offline trajectory optimization pipeline implements processes that include GPS spline estimation (210), cross-registration target selection (220), reference map extraction (230), LIDAR alignment (240), pose graph optimization (250), and trajectory optimization (260). The georeferenced offline trajectory optimization pipeline uses data from logs generated by vehicle sensors from a fleet of vehicles and identifies sets of sensor measurements for a geographic region taken at different times. The sets of sensor measurements include environment geometry data and trajectory data in local coordinate frames. The georeferenced offline trajectory optimization pipeline aligns the environment geometry data between sets of sensor measurements, and, based on the alignment of the environment geometry data, non-rigidly transforms (e.g., bends/warps) the identified corresponding trajectory data into a common coordinate frame. The georeferenced offline trajectory optimization pipeline can then amend the sensor logs with the updated trajectories, which a map building process can use to generate accurate localization maps for autonomous vehicle operation.

In GPS spline estimation, for each vehicle sensor log, trajectory data from the vehicle's inertial measurement units (IMU), wheel speed encoders, and GPS unit are combined and analyzed to yield a spline trajectory, which is a sequence of positions and orientations of the vehicle that represents the path the vehicle drove through a geographic region (210). The position and orientation of the vehicle at a given time is referred to as the vehicle's pose, and a sequence of poses is referred to as the vehicle's trajectory. In addition, the splines can include velocities (linear and rotational) and accelerations (linear and rotational).

A cross-registration target selection process attempts to find locations where it appears there are multiple splines within threshold physical distances to each other (220). These candidate locations, also known as loop closure opportunities, alignment targets, or registration target events, are where multiple vehicles likely drove or where the same vehicle likely drove more than once. In some aspects, cross-registration target selection also differentiates candidate locations by vehicle heading direction. Passes where vehicles are traveling in the same general direction can be grouped together and considered separately from passes in other directions. For example, if the data show a vehicle traveling north in some cases and south through the same area in a few cases, target selection may select one loop closure opportunity among the north-bound set and another loop closure opportunity among the south-bound set, even if those two locations are positionally close to one another.

A reference map extraction process extracts a small reference map for each of the registration target events (230). In some examples, the process extracts, from the vehicle logs, LIDAR data around the time of the registration target event (e.g., a few seconds before and after the event).

In some aspects, LIDAR alignment attempts to find a transformation between each LIDAR keyframe and its corresponding reference map using LIDAR geometry data (240). This transformation can be represented as a pose and its uncertainty.

The pose graph optimization process reduces errors in the final log trajectories by pulling trajectories together wherever matches are found using the nodes and edges in the pose graph (250). The matches are data for physical locations that the pose graph optimization process determines are the same approximate place at different times. The process determines a spatial relationship between the nodes and gives a correction for each node in the graph.

The trajectory optimization process smooths trajectories in each log by combining logged trajectory measurement data from IMUs and wheel speed encoders with the corrected nose poses (260). Trajectory optimization attempts to generate spline representations that satisfy each of these measurements and minimize error between them. For example, if the pose graph places two adjacent samples at a distance that conflicts with the IMU data, the trajectory optimization process combines the two by attempting to minimize the error in an optimization step.

For each log, the trajectory optimization process outputs a new trajectory that is aligned to the other logs in a common reference frame, which can be used to build a map without fuzzy data or ambiguity.

Figure 3A:
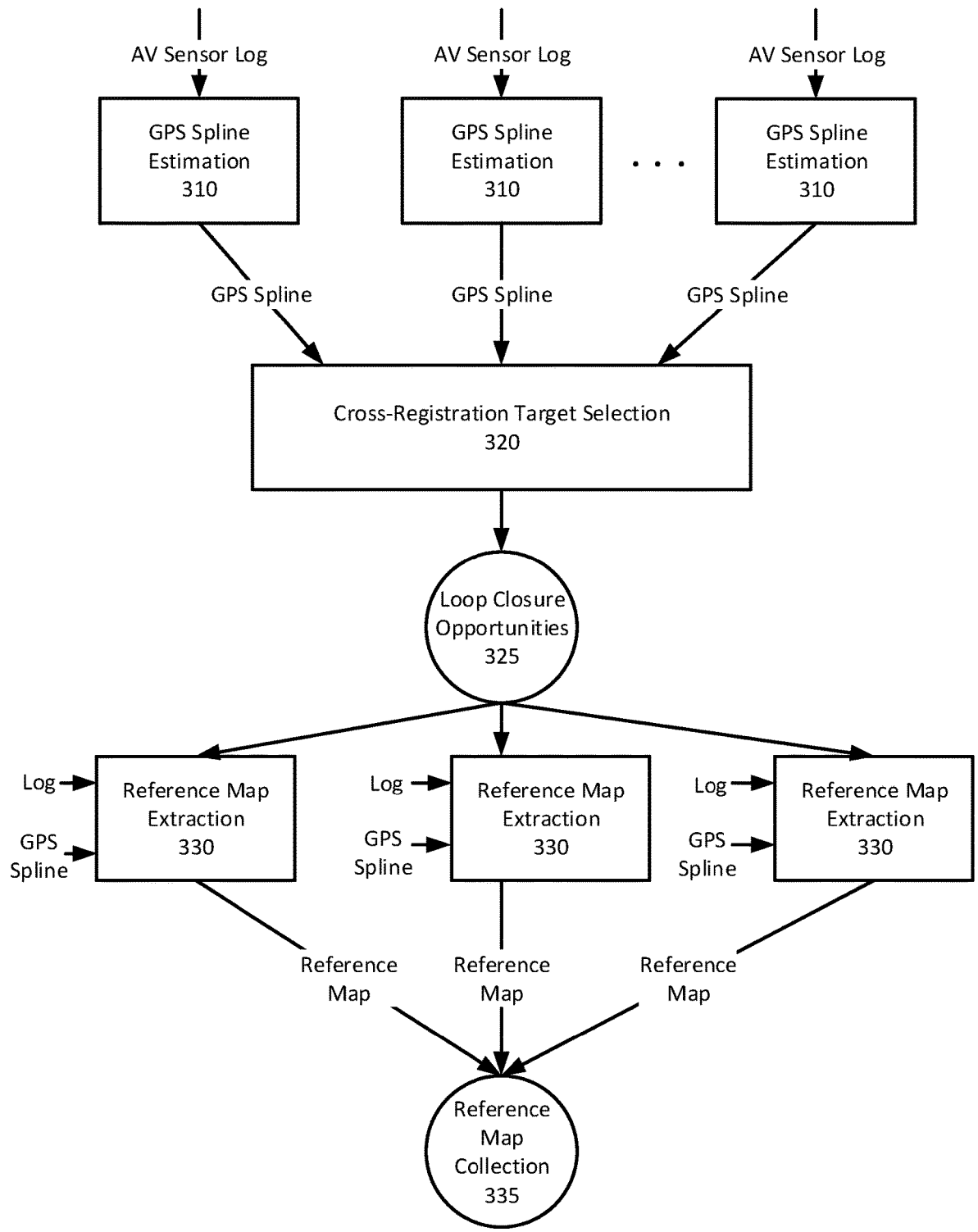
FIG. 3A is a block diagram illustrating example operations and data in a georeferenced offline trajectory optimization pipeline, according to examples described herein.

FIG. 3A is a block diagram illustrating example operations and data in a georeferenced offline trajectory optimization pipeline, according to examples described herein. For each sensor log independently, trajectory data from the vehicle's sensor log are combined in a three-phase trajectory optimization to yield a locally-coherent trajectory with bounded, but potentially large, errors (up to tens of meters). In some examples, the trajectory data includes samples from inertial measurement units (IMU), wheel speed encoders, and a GPS unit. The output of the GPS spline estimation 310 process for each sensor log is a GPS spline. In some examples, the GPS spline is a spline trajectory represented in an appropriate Universal Transverse Mercator (UTM) frame. In other examples, GPS splines are given using coordinates in other map projections.

The first phase of GPS spline estimation 310 takes the sensor data and produces a crude but reasonable starting point for subsequent refinement. In some aspects, GPS spline estimation 310 constructs roughly five-minute sub-segments of the trajectory, using samples from the IMU and wheel speed encoders, and registers each subsegment to its corresponding GPS samples. This estimated transformation (from the local to common frame) can warp significantly over the duration of the log, and significant numbers of GPS samples may be discarded as outliers in each subsegment fit. By blending together the sequence of transformed subsegments into one contiguous trajectory, GPS spline estimation 310 reliably achieves a starting trajectory within the basin of attraction of one or more programmed thresholds or constraints.

The second phase of GPS spline estimation 310 takes the assembled initial trajectory from the first phase and constructs a spline modeling dynamic GPS bias, odometry scale, and IMU gyro and IMU acceleration bias. The spline and calibration parameters are jointly regressed against sensor measurements and a simple motion model.

The third phase of GPS spline estimation 310 takes the refined trajectory from the second phase as initialization, along with IMU, wheel speed encoder, and bias-corrected GPS samples, and optimizes a richer spline trajectory representation and calibration parameters against the measurements and motion model jointly. For each log, this produces a spline trajectory in a common coordinate frame representing the full six degrees of freedom (6DoF) for pose, velocity, and acceleration of the vehicle as a function of time.

A cross-registration target selection 320 process jointly analyzes the collection of GPS splines to identify distinct regions that are visited multiple times within and across different logs. Such regions are favorable targets for cross-registration of sensor data captured at different times. These targets can be referred to as loop closure opportunities (LCO) 325, even though some targets may not correspond to physical loops in a trajectory. Intersections and other join points are characteristic LCOs, but cross-registration target selection 320 also selects moments from vehicle travel along straight roads traversed multiple times in the logs. Along with the identified targets (specified by a timestamp in one of the sensor logs), cross-registration target selection 320 also enumerates, for each LCO 325, a set of query intervals: {log, [start time, end time]} tuples during which sensor data might be usefully registered to the LCO 325. In some examples, the density of LCOs 325 is limited using a non-maximum suppression scheme that considers the most popular LCOs 325 first, adding more to the chosen set until a target density is reached.

For each LCO 325 independently, a reference map extraction 330 process extracts a small reference map by co-registering LIDAR data from the interval around the LCO time in the source sensor log. In some examples, the interval is a few seconds before and after the LCO time. Longer intervals produce larger reference maps with more error, whereas shorter intervals produce small reference maps that are less likely to find interesting matches. The LIDAR points are then co-registered using the pose estimates from the log's GPS spline estimation. While the GPS spline pose estimates can have substantial absolute error in the global frame, the local motion is accurate. In addition, an Iterative Closest Point (ICP) registration step is performed to refine the estimate so the resulting geometry in each reference map is coherent.

In some aspects, reference map extraction 330 also attempts to identify and remove dynamic objects, such as moving vehicles, pedestrians, etc., from the reference map collection 335. In other aspects, no attempt is made to remove the dynamic objects during reference map generation. As a result, the reference maps can include fuzzy tubes of LIDAR points from moving vehicles and other dynamic scene elements. However, reference maps dominated by such movers are unlikely to yield useful alignments.

Figure 3B:
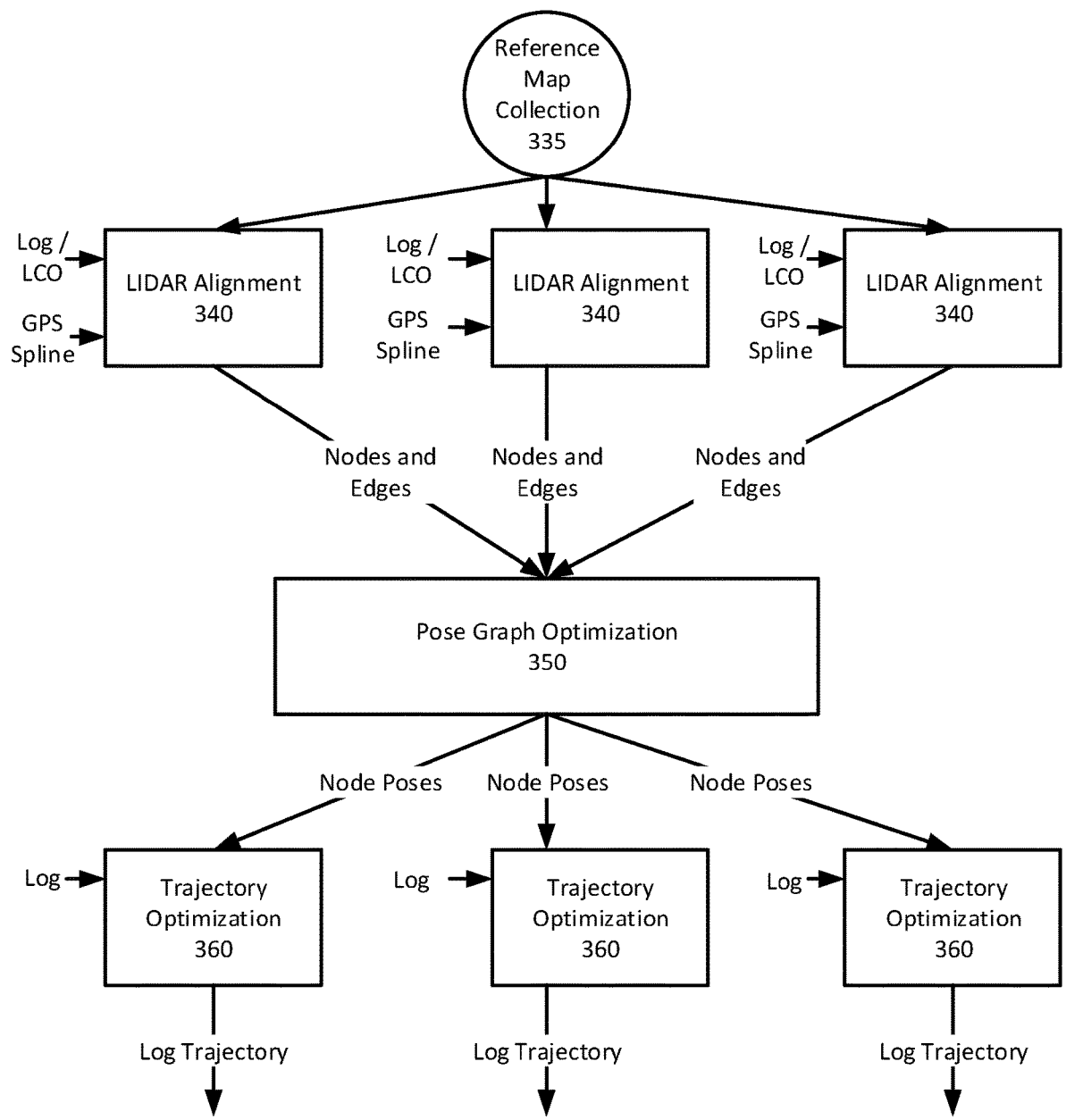
FIG. 3B is a block diagram illustrating further operations and data in a georeferenced offline trajectory optimization pipeline, according to examples described herein.

FIG. 3B is a block diagram illustrating further operations and data in a georeferenced offline trajectory optimization pipeline, according to examples described herein. In some implementations, for each sensor log independently, the GPS spline for that log is traversed to extract environment geometry data. In other implementations, the GPS splines are traversed to extract environment geometry data for each LCO 325 independently.

In some aspects, the environment geometry data are periodic LIDAR keyframes. Each keyframe is a set of co-registered LIDAR points in a local coordinate frame, comprising one or more LIDAR sweeps. In a LIDAR alignment 340 process, these keyframes can be aligned to each other over short time periods and aligned to reference maps produced by the previous step during the corresponding query intervals. Although the process of aligning environment geometry data is described using LIDAR alignment 340, alignment could additionally or alternatively be performed using other data that capture environment geometry/structure/texture, such as sonar, radar, or image data.

The LIDAR alignment 340 process is similar to the one used for localization on the vehicle: a keyframe is registered to a surface model—built from another keyframe or a reference map—by minimizing distances between points and the surface. The result is a maximum-likelihood estimate of the 6DoF rigid transformation (and its uncertainty) between the two coordinate frames.

Unlike steady-state LIDAR alignment on the vehicle, the initial guess for loop closure attempts can be far from accurate. In one aspect, to accommodate this highly uncertain initialization, LIDAR alignment 340 can employ a brute force search over positional perturbations around the relative pose implied by the GPS splines to find a good alignment. This perturbed search resembles the process used for LIDAR-based bootstrapping on the vehicle. In another aspect, LIDAR alignment 340 can directly attempt to coarsely register the data, such as by extracting feature descriptors from the LIDAR or camera data and applying a coarse registration technique.

Each successful alignment between neighboring LIDAR keyframes extracted from the log yields an incremental alignment estimate, while each alignment from an extracted LIDAR keyframe to a previously extracted reference map yields a loop closure. Both incremental alignment estimates and loop closures are edges in the resulting pose graph, with the incremental edges being along a same trajectory (e.g., one vehicle driving down a road), and the loop closure edges tying together one trajectory to another (e.g., two vehicles drove down the same road at different times) or two segments of the same trajectory (e.g., one vehicle drove down the same road at different times). In some examples, for faster execution, LIDAR alignment 340 can skip performing incremental alignment between consecutive LIDAR keyframes, instead synthesizing incremental edges using the relative motion encoded in the GPS spline.

In further aspects, LIDAR alignment 340 can incorporate LIDAR beam intensity values into the alignment process. When alignment is based solely on geometry, uniform and plain areas like tunnels and flat fields can be difficult to distinguish. LIDAR beam intensity values that represent the reflectivity of the surface that the LIDAR beam hits can therefore be used to identify bright areas like road lines, tiled walls, colors, etc., enabling LIDAR alignment 340 to more accurately align logs or LCOs.

The collection of incremental alignments and loop closures from the LIDAR alignment 340, in combination with the reference maps, form one large pose graph. The keyframes and reference maps are the graph's nodes, and the incremental alignment estimates and loop closures form the graph's edges, each an observation of the relative pose between the coordinate frames of its endpoints. The pose graph optimization 350 process determines the layout of the nodes that best satisfies the edges.

Depending on the number of logs and resolution of LIDAR keyframes, this pose graph can be very large. For example, a dataset of 72 logs from northeast San Francisco yields a pose graph with 1.0M nodes and 2.4M edges. The graph itself is very sparse, as most nodes are connected only to their predecessors and successors in a chain. The loop closure edges encode the critical constraints that provide an accurate within-log and across-log layout of the resulting graph.

In some aspects, pose graph optimization 350 employs an iterative nonlinear optimization approach. The objective function is iteratively linearized, and the sparse linear system at each iteration is approximately solved using preconditioned conjugate gradients. Next, the node poses are updated in the manifold of rigid transformations according to the solution to the linear system. A schedule of robust cost functions for the edges (first Huber and then Tukey cost functions, with shrinking scales, in some examples) allows the pose graph optimization to converge reliably even when far from the optimum, while fully ignoring outlier edges from spurious or imperfect LIDAR registration.

To improve efficiency of the pose graph optimization 350, the process can employ a coarse-to-fine initialization for improved convergence rates and lower overall runtime. The initial graph is recursively coarsened into progressively smaller graphs by agglomerating neighboring nodes into clusters. Then, starting from the coarsest graph, each level is optimized, and its result is translated up to the next finer level, ultimately yielding an improved initialization for the full resolution graph. The full input graph is then optimized from that starting point. In addition, using the conjugate gradients method for solving sparse systems of linear equations benefits from a good choice of preconditioner. Rather than a simple block-diagonal preconditioner, pose graph optimization 350 can use an incomplete $LDL^T$ preconditioner, which yields better conditioning for the long chains and sparse loop closures that characterize these pose graphs.

For each log independently, a trajectory optimization 360 process generates absolute pose estimates from the node pose (i.e., keyframe) layout produced by the pose graph optimization 350. The spline trajectory for the log is then optimized against the IMU, wheel speed encoders, and those synthetic pose estimates. This refinement respects the global layout determined from the pose graph, while still producing a locally smooth and coherent trajectory that satisfies the IMU and wheel speed encoder measurements.

In some aspects, each resulting trajectory is sampled to generate a vehicle pose amendment to its input log. The map creation system can then use these amendments in the localization map creation process.

Methodology

Figure 4:
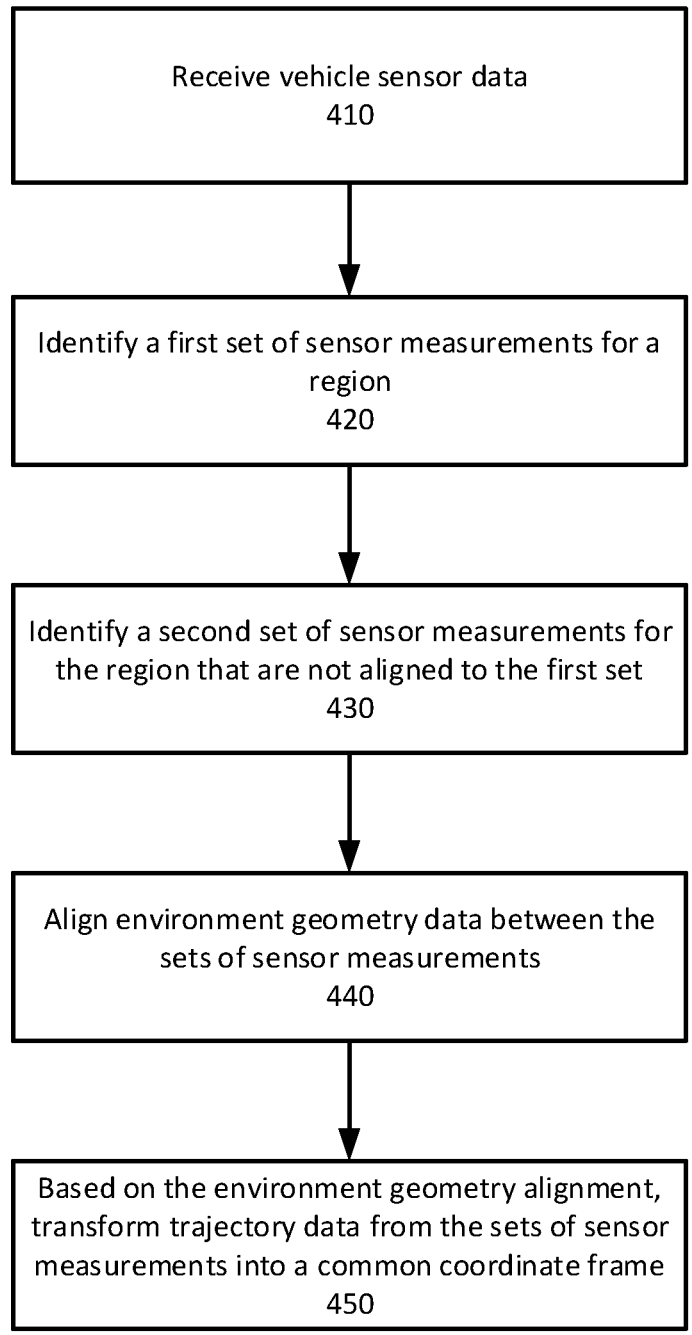
FIG. 4 is a flow chart describing a method of autonomous vehicle trajectory mapping, according to examples described herein.

FIG. 4 is a flow chart describing a method of autonomous vehicle trajectory mapping, according to examples described herein. Although described with respect to two vehicles, the method of autonomous vehicle trajectory mapping can be used to align trajectories in logs from any number of vehicles, including the case where a single vehicle traverses the same geographic region at different times.

With reference to an example of FIG. 4, a georeferenced trajectory estimation system, such as described in FIG. 1, receives data generated by vehicle sensors from a fleet of vehicles (410). According to some aspects, the georeferenced trajectory estimation system identifies, from the received data, a first set of sensor measurements for a geographic region taken by a first vehicle over a first period of time (420). The first set of sensor measurements includes environment geometry data for the geographic region and trajectory data for the first vehicle.

The georeferenced trajectory estimation system identifies, from the received data, a second set of sensor measurements for the geographic region taken by a second vehicle over a second period of time (430). The second set of sensor measurements includes environment geometry data for the geographic region and trajectory data for the second vehicle that is out of alignment with the trajectory data for the first vehicle.

The georeferenced trajectory estimation system aligns the environment geometry data logged from the first vehicle with the environment geometry data logged from the second vehicle (440). Based on the alignment of the environment geometry data, the georeferenced trajectory estimation system transforms the trajectory data logged from both vehicles into a common coordinate frame (450).

Computer System

Figure 5:
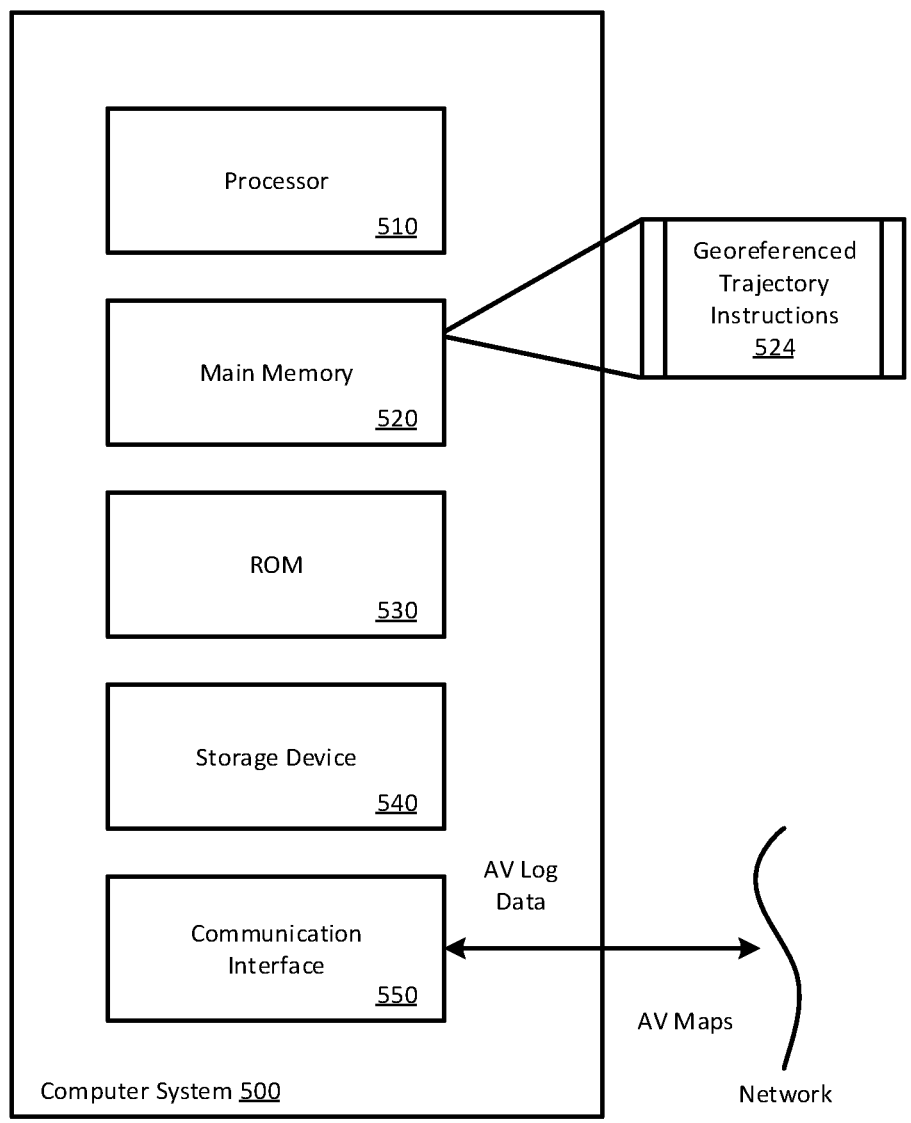
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network computer system for routing and operating autonomous vehicles. In the context of FIG. 1, the AV management system 130 can be implemented using a computer system 500 such as described by FIG. 5. The AV management system 130 may also be implemented using a combination of multiple computer systems such as described by FIG. 5.

In one implementation, the computer system 500 includes processing resources, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks (e.g., a cellular network) through use of a network link (wireless or wired). Using the network link, the computer system 500 can communicate with one or more computing devices, one or more servers, and/or one or more autonomous vehicles. In accordance with some examples, the computer system 500 receives AV sensor log data from a fleet of autonomous vehicles and transmits AV localization maps to the autonomous vehicles. The executable instructions stored in the memory 530 can include georeferenced trajectory instructions 524 to perform one or more of the methods described herein when executed.

By way of example, the instructions and data stored in the memory 520 can be executed by the processor 510 to implement an example AV management system 130 of FIG. 1. In performing the operations, the processor 510 can handle receiving and storing AV sensor log data, calculating georeferenced trajectories, creating localization maps, and transmitting the localization maps to a fleet of AVs. The processor 510 executes instructions for the software and/or other logic to perform one or more processes, steps, and other functions described with implementations such as described by FIGS. 1 through 4.

Examples described herein are related to the use of the computer system 500 for implementing the techniques described. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of, or in combination with, software instructions to implement examples described herein. Thus, the examples described are not limited to any specific combination of hardware circuitry and software.

It is contemplated for examples described herein to extend to individual elements and concepts described, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A georeferenced trajectory system for vehicles, the georeferenced trajectory system comprising:
   a memory to store instructions; and
   one or more processors using the instructions stored in the memory to perform operations including:
      accessing a first set of sensor measurements for a geographic region taken by a first vehicle over a first period of time, the first set of sensor measurements comprising first environment geometry data for the geographic region and first trajectory data for the first vehicle referenced to a first local reference frame;
      accessing a second set of sensor measurements for the geographic region taken by a second vehicle over a second period of time, the second set of sensor measurements comprising second environment geometry data for the geographic region and second trajectory data referenced to a second local reference frame different than the first local reference frame;
      aligning the first environment geometry data with the second environment geometry data;
      based on the alignment of the first environment geometry data with the second environment geometry data, transforming the first trajectory data and the second trajectory data into a common coordinate frame;
      generating a map based on the common coordinate frame; and
      navigating a vehicle using the map based on the common coordinate frame.

2. The georeferenced trajectory system of claim 1, wherein the first trajectory data comprises a first sequence of poses over the first period of time for the first vehicle, and the second trajectory data comprises a second sequence of poses over the second period of time for the second vehicle.

3. The georeferenced trajectory system of claim 1, wherein the first trajectory data and the second trajectory data comprise measurements of vehicle position, orientation, force, or motion taken from at least one of an inertial measurement unit, a wheel speed encoder, and a GPS unit.

4. The georeferenced trajectory system of claim 1, wherein the first environment geometry data and the second environment geometry data are taken from one or more LIDAR units, radar units, sonar units, or cameras.

5. The georeferenced trajectory system of claim 1, wherein the sets of sensor measurements include LIDAR beam intensity values for the geographic region, and wherein the memory stores further instructions to perform operations including transforming the first trajectory data and the second trajectory data into the common coordinate frame based on an alignment of the LIDAR beam intensity values.

6. The georeferenced trajectory system of claim 1, wherein the memory stores further instructions to perform operations including aligning environment geometry data from further sets of sensor measurements to transform further trajectory data into the common coordinate frame.

7. The georeferenced trajectory system of claim 1, wherein the first trajectory data and the second trajectory data are transformed non-rigidly.

8. The georeferenced trajectory system of claim 1, wherein the first vehicle and the second vehicle are the same vehicle.

9. A method of vehicle trajectory mapping, the method being implemented by one or more processors and comprising:
- accessing a first set of sensor measurements for a geographic region taken by a first vehicle over a first period of time, the first set of sensor measurements comprising first environment geometry data for the geographic region and first trajectory data for the first vehicle referenced to a first local reference frame;
- accessing a second set of sensor measurements for the geographic region taken by a second vehicle over a second period of time, the second set of sensor measurements comprising second environment geometry data for the geographic region and second trajectory data referenced to a second local reference frame different than the first local reference frame;
- aligning the first environment geometry data with the second environment geometry data;
- based on the alignment of the first environment geometry data with the second environment geometry data, transforming the first trajectory data and the second trajectory data into a common coordinate frame;
- generating a map based on the common coordinate frame; and
- navigating a vehicle using the map based on the common coordinate frame.

10. The method of claim 9, wherein the identifying steps further comprise sensing as the first trajectory data a first sequence of poses over the first period of time for the first vehicle and as the second trajectory data a second sequence of poses over the second period of time for the second vehicle.

11. The method of claim 9, wherein the identifying steps further comprise measuring vehicle position, orientation, force, or motion taken from at least one of an inertial measurement unit, a wheel speed encoder, and a GPS unit as the first trajectory data and the second trajectory data.

12. The method of claim 9, wherein the identifying steps further comprise taking the first environment geometry data and the second environment geometry data from one or more LIDAR units, radar units, sonar units, or cameras.

13. The method of claim 9, wherein the sets of sensor measurements include LIDAR beam intensity values for the geographic region, and wherein transforming the first trajectory data and the second trajectory data into the common coordinate frame is based on an alignment of the LIDAR beam intensity values.

14. The method of claim 9, further comprising aligning environment geometry data from further sets of sensor measurements to transform further trajectory data into the common coordinate frame.

15. The method of claim 9, wherein transforming the first trajectory data and the second trajectory data into the common coordinate comprises transforming the first trajectory data and the second trajectory data non-rigidly.

16. The method of claim 9, wherein the first vehicle and the second vehicle are the same vehicle.

17. A non-transitory computer-readable medium that stores instructions, executable by one or more processors, to cause the one or more processors to perform operations comprising:
- accessing a first set of sensor measurements for a geographic region taken by a first vehicle over a first period of time, the first set of sensor measurements comprising first environment geometry data for the geographic region and first trajectory data for the first vehicle referenced to a first local reference frame;
- accessing a second set of sensor measurements for the geographic region taken by a second vehicle over a second period of time, the second set of sensor measurements comprising second environment geometry data for the geographic region and second trajectory data referenced to a second local reference frame different than the first local reference frame;
- aligning the first environment geometry data with the second environment geometry data;
- based on the alignment of the first environment geometry data with the second environment geometry data, transforming the first trajectory data and the second trajectory data into a common coordinate frame;
- generating a map based on the common coordinate frame; and
- navigating a vehicle using the map based on the common coordinate frame.

18. The medium of claim 17, further comprising instructions to cause the one or more processors to perform operations including sensing as the first trajectory data a first sequence of poses over the first period of time for the first vehicle and as the second trajectory data a second sequence of poses over the second period of time for the second vehicle.

19. The medium of claim 17, wherein the sets of sensor measurements include LIDAR beam intensity values for the geographic region, further comprising instructions to cause the one or more processors to perform operations including transforming the first trajectory data and the second trajectory data into the common coordinate frame based on an alignment of the LIDAR beam intensity values.

20. The medium of claim 17, further comprising instructions to cause the one or more processors to perform operations including aligning environment geometry data from further sets of sensor measurements to transform further trajectory data into the common coordinate frame.

* * * * *